Nov. 1, 1960      W. A. BIRGE      2,958,826

HIGH SPEED ELECTRONIC INTEGRATOR

Filed March 19, 1956

INVENTOR
WARREN A. BIRGE

BY Julian C. Renfro
ATTORNEY

2,958,826
Patented Nov. 1, 1960

2,958,826

HIGH SPEED ELECTRONIC INTEGRATOR

Warren A. Birge, Winter Park, Fla., assignor to The Martin Company, Middle River, Md., a corporation of Maryland Filed Mar. 19, 1956, Ser. No. 572,552

9 Claims. (Cl. 328—127)

The present invention relates to a high speed electronic integrator adapted to yield the accurate time integral of applied voltages having high repetition rate pulse waveforms, the pulses being of short duration, for example, of the order of 0.05–500 microseconds.

The production of a voltage waveform representing the accurate time integral of another voltage waveform has long been effected by so-called electronic feedback-integrators. Basically such integrators comprise a resistor and a capacitor connected to form a series circuit, and a feedback network arranged in circuit relationship with, but external to, the series circuit. The feedback network serves to maintain current flow in the series resistor-capacitor (RC) circuit directly proportional to the voltage waveform applied thereacross, thereby causing the accurate time integral of the applied voltage to appear as a potential developed across the capacitor. A classic example of the feedback-integrator circuit is the so-called "Miller" integrator, a description of which may be found on pages 278–285, volume 19 of the Radiation Laboratory Series, entitled "Waveforms."

The described feedback-integrator, and the many modifications of this basic form, possess certain undesirable features, particularly when operating with applied voltages having waveforms of short duration. For example, many of the feedback-integrators require an extremely high gain feedback loop to achieve workable integrating accuracy, thus often necessitating the use of multistage wideband amplifiers and introducing the instability problems frequently encountered therewith. In addition, and of more serious concern, the rate of response of the feedback-integrator is very often too sluggish to permit the accurate integration of waveforms of short duration. Rate of integrator response is herein defined as the speed with which the feedback loop adjusts current flow in the series circuit in response to changes in the applied voltage. Evidently, a sluggish rate of response will result in non-proportionality between series circuit current flow and applied voltage for a short period of time, an intolerable condition in integrators designed to work with short duration pulses.

The conventional feedback-integrator also possesses features that hinder the accurate integration of voltage waveforms having relatively high repetition rates. In particular, there exist inherent difficulties in rapidly and efficiently disconnecting the integrating capacitor from the remainder of the circuit. Disconnection time limits the recovery or restoration speed of the capacitor in such integrators, thereby increasing the required time elapse between integrating cycles and decreasing the permissible integration repetition rate. Additionally if the sum of a series of high repetition rate pulse integrations is desired, disconnection of the integrating capacitor during the periods between the integration of the voltage pulses is advantageous since it prevents the loss of the accumulated potentials developed across the capacitor. In addition to the disconnection problems, in many feedback integrators both ends of the integrating capacitor float freely potentialwise, thus further complicating the task of rapid capacitor restoration.

The electronic integrator of the present invention represents a departure from the conventional feedback-integrator and possesses certain distinct advantages thereover when the integration of short duration or high repetition rate waveforms is desired.

As in the conventional feedback-integrator, the present invention comprises a series resistor-capacitor (RC) circuit and a feedback network arranged in circuit relationship therewith. However, in the present invention, a portion of the feedback network employed is arranged in series relation with the RC circuit, thereby differing from the external feedback network arrangement of the conventional integrator. The feedback portion so arranged comprises a vacuum tube having at least an anode, a control grid, and a cathode, the cathode-anode path thereof being connected in series between the resistor and capacitor of the series circuit.

The vacuum tube so inserted serves a dual purpose, first, it acts as a capacitor charging current regulator, and second, it serves as a means for electrically disconnecting the integrating capacitor from the remainder of the circuit. The current regulating function is effected by applying a control potential to the grid of the vacuum tube, the potential being varied so as to maintain the current flow in the series circuit substantially proportional at all times to the applied voltage causing the current flow. The preferred means for producing such a control potential comprises an electronic amplifier responsive to variations in the potential at which the vacuum tube cathode operates, and adapted to produce a grid control potential which varies inversely with respect to the potential variations at the cathode. It has been found that such an amplifier may comprise simply a single conventional stage of amplification, the gain-bandwith requirement of which is relatively very low. It has also been found that the described series vacuum tube current regulation endows the integrator of this invention with an extremely rapid response, thereby permitting the accurate integration of voltage pulses of the order of 0.05 microsecond in duration.

The disconnect function of the vacuum tube is inherent in the position of the tube in series relation between the resistor and capacitor. This interposition physically isolates the capacitor so that the problem of electrical disconnection is reduced to that of applying a cutoff potential to the vacuum tube.

Because of the described feedback network arrangement the integrating capacitor of the present invention need not float freely potentialwise but may be referred to a potential base. Therefore, restoration may be simply effected by momentarily connecting the free end of the capacitor to a restoring potential source.

The invention will now be described in detail in connection with the accompanying drawing, in which.

Figure 1:
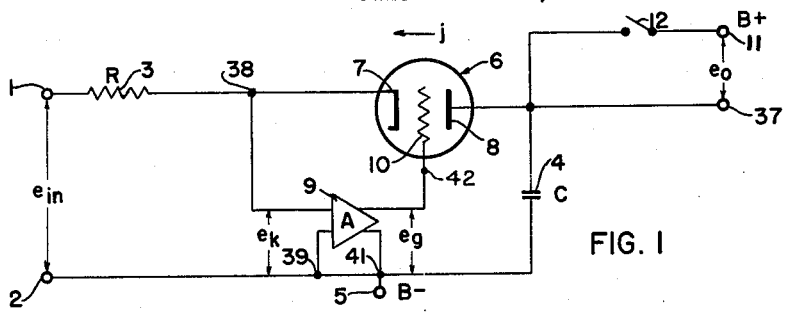
Fig. 1 is a schematic diagram of the electronic integrator of this invention.

The electronic integrator of Fig. 1 comprises a series circuit including a resistor 3, a capacitor 4, and the cathode-anode path of triode vacuum tube 6, the cathode 7 being connected to resistor 3 and the anode 8 being connected to capacitor 4. The circuit is provided with input terminals 1, 2, for applying a voltage, $e_{in}$, across the series circuit, a negative or zero reference potential terminal 5 connected to input terminal 2, and terminal 37 for sensing the output potential developed across capacitor 4.

As is well known a capacitor alone will yield the time integral of a charging current $i$ in the form of a potential, $$e = \frac{1}{C}\int i\, dt$$

appearing across the capacitor. Therefore, in order for the potential appearing across capacitor 4 to represent the time integral of the applied voltage $e_{in}$, the charging current $i$ flowing in the circuit must be an accurate measure of $e_{in}$, a condition impossible to obtain in a simple series resistor-capacitor circuit because the potential at the junction of the resistor and capacitor will vary continuously as the capacitor is charged.

Vacuum tube 6 and amplifier 9 serve to maintain the charging current $i$ substantially directly proportional to $e_{in}$. To this end amplifier 9 is referred to a fixed potential, in this case B—, by connecting input terminal 39 and output terminal 41 to terminal 5, and arranged in circuit relationship with respect to the series circuit by connecting input terminal 38 to a point between resistor 3 and cathode 7, and output terminal 42 to the control grid 10 of vacuum tube 6. Current proportionality is obtained by adapting amplifier 9 and vacuum tube 6 to maintain the potential across the amplifier input, $e_k$, constant during the entire integrating period. This is effected by so operating the amplifier that any potential change at its input, $e_k$, will result in the production of an inverse potential change at its output, $e_g$, which is impressed upon control grid 10. Thus, if $e_k$ were to decrease in value, $e_g$ would become more positive until the increased plate current (the charging current $i$) in vacuum tube 6 causes $e_k$ to return to its initial value. In effect, the stabilizing of $e_k$ results in the production of a control potential for control grid 10, $e_g$, which is related to $e_{in}$, thereby maintaining current flow through vacuum tube 6 proportional to $e_{in}$.

That the potential developed across capacitor 4 is a true integral of the applied voltage $e_{in}$ will now be demonstrated.

Assume that amplifier 9 has an infinite input impedance, and that output potential $e_o$ is measured with reference to a positive reference potential point 11 having the value B+. The current flow through the series RC circuit is then given by the equation (1) $$i(t) = \frac{e_{in} - e_k}{R}$$

If the capacitor is initially charged to the reference potential B+ by closing a switch 12, the switch being subsequently opened to permit integration, the slope of its potential function $e_o(t)$ may be expressed by the familiar equation (2) $$C\frac{de_o}{dt} = i(t)$$

or by substitution of Equation 1

(3) $$\frac{de_o}{dt} = \frac{e_{in} - e_k}{RC}$$

Assuming $e_k$ to be maintained constant at zero potential by amplifier 9, Equation 3 reduces to (4) $$\frac{de_o}{dt} = \frac{e_{in}}{RC}$$

or (5) $$e_o = \frac{1}{RC}\int_0^t e_{in}\, dt$$

Thus the potential appearing across capacitor 4 is shown to be the time integral of the applied voltage $e_{in}$.

It will be noted that integrating capacitor 4 is physically isolated from the remainder of the circuit by means of vacuum tube 6. Because of this arrangement the capacitor may be electrically disconnected at any time simply by applying a cutoff potential to the vacuum tube.

Restoration of the integrating capacitor may be easily and rapidly effected, a preferred means for restoration being illustrated in Fig. 1. One side of capacitor 4 is connected to reference potential point 5 (B—), the restoration of the capacitor being effected by momentarily returning the anode side of the capacitor to reference potential point 11 (B+) by means of switch 12. Many other means for restoring the integrating capacitor may of course be used. It should be noted that, since one side of the capacitor 4 is returned to B—, it is not necessary to cut off vacuum tube 6 in order to effect restoration of the capacitor.

Figure 2:
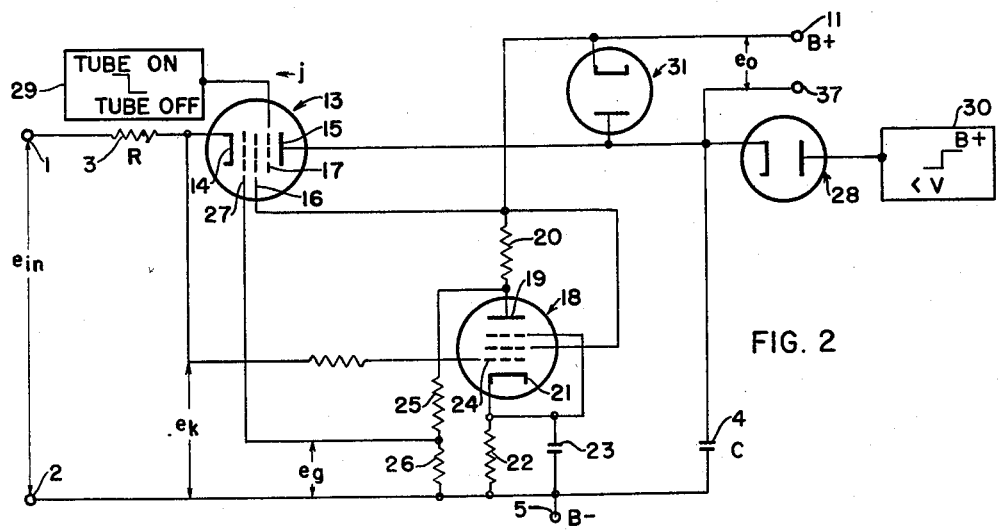
Fig. 2 is a detailed schematic diagram of the electronic integrator of this invention illustrating means for disconnecting and restoring the integrating capacitor.

Fig. 2 illustrates an electronic integrator capable of accurately operating on short duration (0.05 microsecond), or high repetition rate waveforms. Numerals employed heretofore are used to identify similar elements in Fig. 2. The integrator comprises a series RC circuit having a pentode vacuum tube 13, the cathode-anode path thereof being connected in series between resistor 3, and capacitor 4, the cathode 14 being connected to resistor 3, the anode 15 to capacitor 4, and the screen grid 16 to positive reference potential point 11 (B+). Current control is provided by a conventional amplifier stage comprising a pentode vacuum tube 18, having anode 19 connected to a positive reference potential point 11 (B+) through a load resistor 20, and cathode 21 connected to a negative reference potential point 5 (B—) through a bias resistance 22 and a by-pass capacitor 23. The amplifier input, $e_k$, is taken from a point between resistor 3 and cathode 14 and is connected to the control grid 24 of vacuum tube 18. The amplifier output is taken from a point between load resistor 20 and anode 19, is attenuated through a divider network, resistors 25 and 26, to the proper value, $e_g$, for maintaining $e_k$ constant, and is then connected to the control grid 27 of vacuum tube 13. In many applications resistance-capacitance coupling may be used between anode 19 and grid 27. Such coupling would be effected in Fig. 2 by replacing resistor 25 by a coupling capacitor.

The simplicity of the circuit and of its operation is apparent. Merely a single conventional stage of amplification is required for excellent current control and extremely rapid response. Disconnection of integrating capacitor 4 is effected simply by applying a cutoff potential to suppressor grid 17 of vacuum tube 13. In practice this may be effected by means of a square wave potential source 29 adapted to intermittently produce a cutoff potential related in time to the applied voltage $e_{in}$ so that the intervals of disconnection fall between the intervals during which integration is desired.

Restoration of integrating capacitor 4 is effected by means of a restoring diode 28 in place of the switch used in the circuit of Fig. 1. The cathode of diode 28 is connected to the free side of capacitor 4, and the anode is connected to a restoring potential source 30. To explain the operation of the restoring diode assume that during the integrating period the potential at anode 15 decreases to V from its initial potential B+. Restoration to B+ may then be effected by adjusting the output of potential source 30 to the value B+ since the orientation of diode 28 will permit current flow therethrough until its cathode arrives at the B+ potential. Diode 31 is introduced into the circuit to prevent the free end of capacitor 4 from rising above B+. During the integrating period the potential output of source 30 should be adjusted to some value below V so that diode 28 will be cut off thereby permitting the potential across capacitor 4 to change in value. In practice potential source 30 might be a square wave generator tuned in synchronism with potential source 29 so that the cutoff and the restoring intervals coincide. In this way the restoration of the integrating capacitor may be made to start immediately upon the termination of an integrating period thereby minimizing the time required for restoration and increasing the permissible repetition rate of the waveforms to be integrated.

Figure 3:
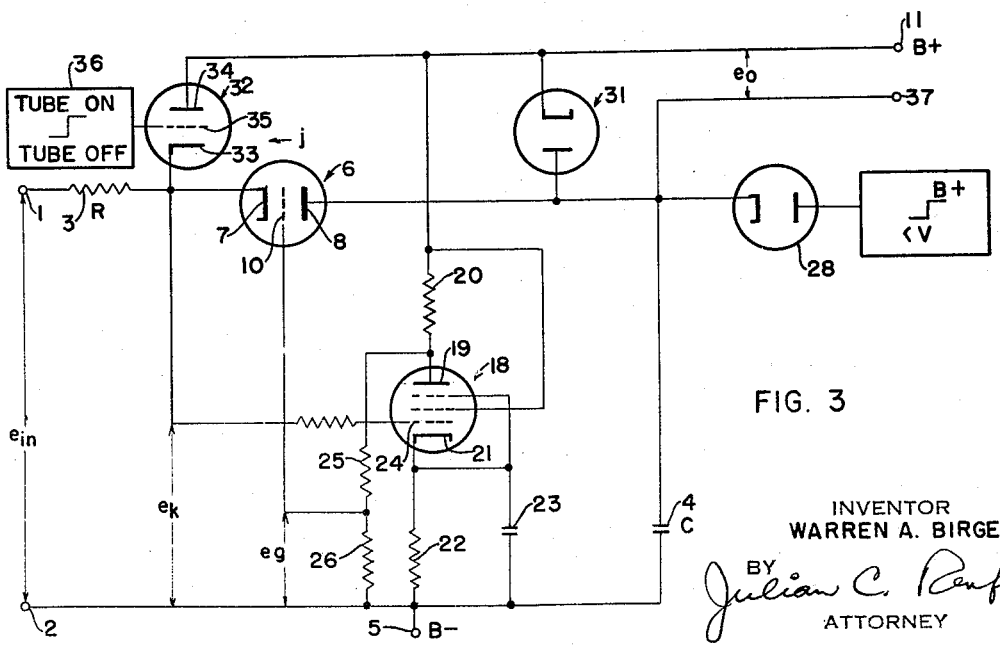
Fig. 3 is a detailed schematic diagram of the electronic integrator of this invention illustrating an alternative means for disconnecting the integrating capacitor.

Fig. 3 illustrates an electronic integrator which incorporates an alternative means for disconnecting integrating capacitor 4. Numerals employed heretofore are used to identify similar elements in Fig. 3. In this embodiment the current controlling vacuum tube may be a triode 6. Disconnection of integrating capacitor 4 is effected by a current switching device, in this case triode 32. The cathode 33 of triode 32 is connected to a point between resistor 3 and cathode 7, and the anode 34 is connected to reference potential point 11 (B+). The control grid 35 of triode 32 is connected to a disconnect potential source 36. During the integrating period, the output of potential source 36 is adjusted to cutoff tube 32. When the integrating capacitor is to be disconnected the output of potential source 36 is raised causing the potential at the junction of cathode 7 and 33 to rise sufficiently above $e_g$ to cut off tube 6, thus causing the current through resistor 3 to flow entirely through vacuum tube 32 rather than through vacuum tube 6. Many other current switching means may of course be used in place of triode 32. In both the disconnect means of Figs. 1 and 2, when the disconnect is performed, the charge on capacitor 4 will remain until dissipated by leakage.

Preferred embodiments of the invention have been described. Various changes and modifications however may be made within the scope of the invention as set forth in the appended claims.

I claim:

1. A high speed electronic integrator comprising a resistor, a capacitor, and a vacuum tube having at least a cathode, a control grid and an anode, said resistor, the cathode, anode path of said tube, and said capacitor being connected in the order named as a series circuit across which is applied a voltage of which the time integral is desired, an electronic amplifier associated with said series circuit, adapted to produce a control potential related to the voltage applied across said series circuit for application to said control grid being adapted to vary the said control potential applied to said control grid inversely with respect to potential variations at said cathode so as to maintain the current flow in said series circuit substantially proportional at all times to the voltage applied across said series circuit, whereby the potential developed across said capacitor is representative of the time integral of the voltage applied across said series circuit.

2. A high speed electronic integrator comprising a series circuit including a vacuum tube having at least an anode, a control grid and a cathode, a resistor connected to said cathode, and a capacitor connected to said anode, across which series circuit is to be applied a voltage the time integral of which is desired, a reference potential point connected to the end of said capacitor remote from said anode, an electronic amplifier, the input of said amplifier being connected at one terminal to said reference potential point and at the other terminal to a point between said resistor and said cathode, the output of said amplifier being connected at one terminal to said reference potential point and at the other terminal to said control grid, said amplifier acting to vary the potential across said output inversely with respect to variations in the potential across said input so as to substantially prevent at all times said input potential variations, and output connections across said capacitor, whereby a potential representative of the time integral of the voltage applied across said series circuit may be sensed at said output connections.

3. A high speed electronic integrator comprising a series circuit including a first vacuum tube having at least an anode, a control grid and a cathode, a resistor connected to said cathode, and a capacitor connected to said anode, across which series circuit may be applied a voltage of which the time integral is desired, a reference potential point connected to the end of said capacitor remote from said anode, means for maintaining the current flow in said series circuit substantially proportional at all times to the voltage applied across said series circuit including an electronic amplifier comprising a second vacuum tube having at least an anode, a control grid and a cathode, and a load impedance connected to said anode, the control grid of said second vacuum tube being connected to a point between said resistor and the cathode of said first vacuum tube, and the control grid of said first vacuum tube being connected to a point between said load impedance and the anode of said second vacuum tube, a D.C. potential source connected across said amplifier and to said reference potential point, and output connections across said capacitor, whereby a potential representative of the time integral of the voltage applied across said series circuit may be sensed at said output connections.

4. A high speed electronic integrator comprising a series circuit including a vacuum tube having at least three elements, an anode, a control grid, and a cathode, a resistor connected to said cathode, and a capacitor connected to said anode, across which series circuit may be applied a voltage of which the time integral is desired, an electronic amplifier associated with said series circuit and adapted to produce a control potential related to the voltage applied across said series circuit, for application to said control grid, said amplifier being adapted to vary the said control potential applied to said control grid inversely with respect to potential variations at said cathode so as to maintain the current flow in said series circuit substantially proportional at all times to the voltage applied across said series circuit, a pair of output connections across said capacitor to enable a potential representative of the time integral of the voltage applied across said series circuit to be sensed, and means for electrically disconnecting said capacitor from the remainder of said integrator at intervals related in time to the voltage applied across said series circuit, said last named means including a disconnect potential source adapted to produce a cutoff potential, and means for intermittently applying said cutoff potential to an element of said vacuum tube other than said anode.

5. A high speed electronic integrator comprising a series circuit including a vacuum tube having at least four elements, an anode, a first and second control grid, and a cathode, a resistor connected to said cathode, and a capacitor connected to said anode, across which series circuit may be applied a voltage of which the time integral is desired, an electronic amplifier associated with said series circuit and adapted to produce a control potential related to the voltage applied across said series circuit, for application to said control grid, said implifier being adapted to vary the said control potential applied to said control grid inversely with respect to potential variations at said cathode so as to maintain the current flow in said series circuit substantially proportional at all times to the voltage applied across said series circuit, means enabling the potential developed across said capacitor representative of the time integral of the voltage applied across said series circuit to be sensed, and means for electrically disconnecting said capacitor from the remainder of said integrator at intervals related in time to the voltage applied across said series circuit, said last named means including a disconnect potential source adapted to produce a cutoff potential, and means for intermittently applying said cutoff potential to said second control grid.

6. A high speed electronic integrator comprising a series circuit including a vacuum tube having at least an anode, a control grid and a cathode, a resistor connected to said cathode, and a capacitor connected to said anode, across which series circuit may be applied a voltage of which the time integral is desired, an electronic amplifier associated with said series circuit and adapted to produce a control potential related to the voltage applied across said series circuit, for application to said control grid, said amplifier being adapted to vary the said control potential applied to said control grid inversely with respect to potential variations at said cathode so as to maintain the current flow in said series circuit substantially proportional at all times to the voltage applied across said series circuit, means enabling the potential developed across said capacitor representative of the time integral of the voltage applied across said series circuit to be sensed, and means for electrically disconnecting said capacitor from the remainder of said integrator at intervals related in time to the voltage applied across said series circuit, said last named means including a disconnect potential source adapted to produce a cutoff potential, and a switching device having at least two terminals, one of said terminals being connected to said disconnect potential source, and the other of said terminals being connected to a point between said resistor and said cathode.

7. A high speed electronic integrator comprising a series circuit including a vacuum tube having at least an anode, a control grid and a cathode, a resistor connected to said cathode, and a capacitor connected to said anode, across which series circuit may be applied a voltage the time integral of which is desired, a reference potential point connected to the end of said capacitor remote from said anode, an electronic amplifier associated with said series circuit and adapted to produce a control potential related to the voltage applied across said series circuit, for application to said control grid, said amplifier being adapted to vary the said control potential applied to said control grid inversely with respect to potential variations at said cathode so as to maintain the current flow in said series circuit substantially proportional at all times to the voltage applied across said series circuit, connection means enabling the potential developed across said capacitor representative of the time integral of the voltage applied across said series circuit to be sensed, means for electrically disconnecting said capacitor from the remainder of said integrator at intervals related in time to the voltage applied across said series circuit, said last named means including a disconnect potential source adapted to produce a cutoff potential, and means for intermittently applying said cutoff potential to an element of said vacuum tube other than said anode, and means for restoring said capacitor in coincidence with the said time intervals during which said cutoff potential is applied to said vacuum tube.

8. A high speed electronic integrator comprising a series circuit including a vacuum tube having at least an anode, a control grid and a cathode, a resistor connected to said cathode, and a capacitor connected to said anode, across which series circuit may be applied a voltage the time integral of which is desired, a reference potential point connected to the end of said capacitor remote from said anode, an electronic amplifier associated with said series circuit and adapted to produce a control potential related to the voltage applied across said series circuit, for application to said control grid, said amplifier being adapted to vary the said control potential applied to said control grid inversely with respect to potential variations at said cathode so as to maintain the current flow in said series circuit substantially proportional at all times to the voltage applied across said series circuit, connection means enabling the potential developed across said capacitor representative of the time integral of the voltage applied across said series circuit to be sensed, means for electrically disconnecting said capacitor from the remainder of said integrator at intervals related in time to the voltage applied across said series circuit, said last named means including a disconnect potential source adapted to produce a cutoff potential, and means for intermittently applying said cutoff potential to an element of said vacuum tube other than said anode, and means for restoring said capacitor in coincidence with the said time intervals during which said cutoff potential is applied to said vacuum tube including a restoring potential source, and a switching device having at least two terminals, one of said terminals being connected to said restoring potential source, the other of said terminals being connected to a point between said capacitor and said anode.

9. A high speed electronic integrator comprising a resistor, a capacitor, and a vacuum tube having at least a cathode, a control grid, and an anode, said resistor, the cathode-anode path of said vacuum tube, and said capacitor being connected in the order named as a series circuit across which the input potential to be integrated with respect to time is applied, circuit means connected to said cathode and adapted to sense potential variations at said cathode, said circuit means being further connected to apply a control potential to said grid and being adapted to vary said control potential inversely with respect to said potential variations so as to maintain current flow through said vacuum tube in proportion to said input potential, whereby the potential developed across said capacitor will be representative of the time integral of said input potential.

References Cited in the file of this patent

UNITED STATES PATENTS

| | | |
|---|---|---|
| 2,206,123 | Rinia et al. | July 2, 1940 |
| 2,282,340 | Pieplow | May 12, 1942 |
| 2,452,683 | Rieke | Nov. 2, 1948 |
| 2,519,763 | Hoglund | Aug. 22, 1950 |
| 2,551,407 | Adler | May 1, 1951 |

FOREIGN PATENTS

| | | |
|---|---|---|
| 1,032,174 | France | Mar. 25, 1953 |

OTHER REFERENCES

Book entitled "Time Bases," by O. S. Puckle, 2nd ed., 1951, John Wiley and Sons, pages 128–131.